US012763009B2

(12) United States Patent
Kim et al.

(10) Patent No.: US 12,763,009 B2
(45) **Date of Patent: *Oct. 13, 2026**

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventors: Changhun Kim, Suwon-si (KR); Deukgeun Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/236,228

(22) Filed: Jun. 12, 2025

(65) Prior Publication Data

US 2025/0308441 A1 Oct. 2, 2025

Related U.S. Application Data

(63) Continuation of application No. 18/627,085, filed on Apr. 4, 2024, now Pat. No. 12,361,868, which is a (Continued)

(30) Foreign Application Priority Data

Jan. 20, 2023 (KR) ........................ 10-2023-0009048

(51) Int. Cl.
*G09G 3/32* (2016.01)

(52) U.S. Cl.
CPC ........... *G09G 3/32* (2013.01); *G09G 2310/08* (2013.01); *G09G 2370/08* (2013.01)

(58) Field of Classification Search
None
See application file for complete search history.

(56) References Cited

U.S. PATENT DOCUMENTS

| | | | | |
|---|---|---|---|---|
| 7,961,157 B2 | 6/2011 | Perkins et al. | | |
| 8,890,770 B2 * | 11/2014 | Koebrich | G09G 5/00 | 345/1.3 |

(Continued)

FOREIGN PATENT DOCUMENTS

| | | |
|---|---|---|
| CN | 111754926 B | 5/2022 |
| EP | 3 726 369 A1 | 10/2020 |

(Continued)

OTHER PUBLICATIONS

International Search Report (PCT/ISA/210) issued by the International Searching Authority on Apr. 23, 2024 in corresponding International Application No. PCT/KR2024/000839.

(Continued)

*Primary Examiner* — Kenneth Bukowski
(74) *Attorney, Agent, or Firm* — Sughrue Mion, PLLC

(57) ABSTRACT

Disclosed are an electronic device and a controlling method of an electronic device. In particular, electronic device includes: a display panel divided into a plurality of regions; a panel driver configured to control driving of the display panel; a plurality of timing controllers configured to control the panel driver, each including two ports disposed in opposite directions, connected to each other through the two ports, and each corresponding to each of the plurality of regions; and a first processor configured to transmit a signal in a first direction through the plurality of timing controllers, wherein the plurality of timing controllers are configured to identify input/output directions of the two ports included in each of the plurality of timing controllers that correspond to the first direction in case of receiving a first signal including image data and a control instruction for transmitting the image data in the first direction from the first processor; and transmit the first signal in the first direction through the two ports included in each of the plurality of timing controllers and having the input/output directions identified as corre- (Continued)

sponding to the first direction. Various other embodiments are possible.

20 Claims, 10 Drawing Sheets

Related U.S. Application Data continuation of application No. PCT/KR2024/000839, filed on Jan. 17, 2024.

(56) References Cited

U.S. PATENT DOCUMENTS

| | | | |
|---|---|---|---|
| 9,953,552 B2 | 4/2018 | Yuan et al. | |
| 11,055,052 B2 | 7/2021 | Seo et al. | |
| 11,327,855 B2 | 5/2022 | Kim | |
| 11,694,601 B2 | 7/2023 | Hussell | |
| 2001/0036193 A1 | 11/2001 | Kori | |
| 2017/0098421 A1 | 4/2017 | Son | |
| 2018/0165051 A1 | 6/2018 | Kim et al. | |
| 2020/0159483 A1 | 5/2020 | Yoshihara | |
| 2020/0326899 A1* | 10/2020 | Seo | G06F 3/1446 |
| 2021/0011820 A1 | 1/2021 | Kim | |
| 2021/0118355 A1* | 4/2021 | Zhao | G09G 5/18 |
| 2021/0326092 A1* | 10/2021 | Ahn | H04N 21/43072 |
| 2022/0208057 A1 | 6/2022 | You et al. | |
| 2022/0277679 A1 | 9/2022 | Lee et al. | |
| 2023/0236785 A1 | 7/2023 | Joo et al. | |

FOREIGN PATENT DOCUMENTS

| | | | |
|---|---|---|---|
| EP | 3 896 984 | A1 | 10/2021 |
| JP | 2006-227450 | A | 8/2006 |
| JP | 2013-80229 | A | 5/2013 |
| JP | 2017-207580 | A | 11/2017 |
| KR | 10-1915311 | B1 | 11/2018 |
| KR | 10-1987186 | B1 | 6/2019 |
| KR | 10-2095164 | B1 | 3/2020 |
| KR | 10-2020-0121182 | A | 10/2020 |
| KR | 10-2021-0007579 | A | 1/2021 |
| KR | 10-2022-0012228 | A | 2/2022 |

OTHER PUBLICATIONS

Written Opinion (PCT/ISA/237) issued by the International Searching Authority on Apr. 23, 2024 in corresponding International Application No. PCT/KR2024/000839.

U.S. Appl. No. 18/627,085, filed Apr. 4, 2024.

Communication issued on Aug. 28, 2025 by the European Patent Office in European Patent Application No. 24744875.6.

Communication dated Jul. 6, 2026 issued by the Korean Ministry of Intellectual Property in counterpart Korean Patent Application No. 10-2023-0009048.

* cited by examiner

ELECTRONIC DEVICE AND CONTROLLING METHOD OF ELECTRONIC DEVICE

CROSS-REFERENCE TO RELATED APPLICATIONS

This application is a continuation of U.S. application Ser. No. 18/627,085, filed on Apr. 4, 2024, which is a by-pass continuation of International Application No. PCT/KR2024/000839, filed on Jan. 17, 2024, which is based on and claims priority to Korean Patent Application No. 10-2023-0009048 filed on Jan. 20, 2023, in the Korean Intellectual Property Office, the disclosures of which are incorporated by reference herein in their entireties.

BACKGROUND

1. Field

The disclosure relates to an electronic device and a controlling method of an electronic device, and more particularly, to an electronic device which may variably determine a direction of an input/output port included in each of a plurality of timing controllers, and a controlling method of an electronic device.

2. Description of the Related Art

In recent years, developments of technology for reducing a pitch between pixels included in a display panel, and technology for enlarging a size of the display panel, are accelerating in the display field.

However, more hardware components and signal transmission lines may be included in the same area of the display panel when the pitch between the pixels included in the display panel is reduced. In addition, wiring instability, increased complexity inside the display device, and an increased cost may occur due to the increasing number of signal transmission lines included in the display panel when the size of the display panel is enlarged.

In addition, directions of input/output ports included in a plurality of timing controllers corresponding to each region of the display panel are often fixed in current displays, which may result in increased complexity in designing the signal transmission lines, and increase the difficulty of effectively coping with a situation where a signal is not normally transmitted between the plurality of timing controllers.

SUMMARY

Provided is an electronic device which may simplify the design of signal transmission lines and effectively cope with a situation where a signal is not normally transmitted by variably determining a direction of an input/output port included in each of a plurality of timing controllers, and a controlling method of an electronic device.

According to an aspect of the disclosure, an electronic device includes: a display panel including a plurality of regions; a panel driver configured to control driving of the display panel; a plurality of timing controllers, wherein each timing controller of the plurality of timing controllers includes two ports disposed in opposite directions, the plurality of timing controllers are connected to each other through the respective two ports, and each timing controller of the plurality of timing controllers corresponds to a region of the plurality of regions; and a first processor configured to transmit a first signal in a first direction through the plurality of timing controllers, wherein the first signal includes image data and a control instruction for transmitting the image data in the first direction, and wherein the plurality of timing controllers are configured to: based on receiving the first signal from the first processor, identify an input/output direction of each of the two ports of each timing controller of the plurality of timing controllers corresponding to the first direction, configure the input/output direction of each of the two ports of each timing controller of the plurality of timing controllers to the correspond to the identified input/output directions, and transmit the first signal in the first direction through the two ports of each timing controller of the plurality of timing controllers.

The electronic device may further include: a second processor configured to transmit a second signal in a second direction opposite to the first direction through the plurality of timing controllers, wherein the second signal may include the image data and a control instruction for transmitting the image data in the second direction, and wherein the plurality of timing controllers may be configured to, based on receiving the first signal from the first processor, not transmit the second signal in the second direction while the first signal is transmitted in the first direction.

The plurality of timing controllers may include a first timing controller directly connected to the first processor, a second timing controller directly connected to the first timing controller, a third timing controller directly connected to the second timing controller, and a fourth timing controller directly connected to the second processor, the first direction may be a transmission direction of the first signal from the first timing controller to the fourth timing controller, and the second direction may be a transmission direction of the second signal from the fourth timing controller to the first timing controller.

The two ports of the first timing controller may include a first port directly connected to the first processor and a second port directly connected to the second timing controller, and the first timing controller may be configured to, based on receiving the first signal from the first processor, identify the first port as an input port and the second port as an output port.

The fourth timing controller may be configured to: based on receiving the first signal within a predetermined threshold time, transmit in the second direction a state signal related to a state of the display panel, and based on not receiving the first signal within the predetermined threshold time, receive the second signal from the second processor, identify the input/output direction of each of the two ports of the fourth timing controller corresponding to the second direction, configure the input/output direction of each of the two ports of the fourth timing controller to correspond to the identified input/output directions of the two ports of the fourth timing controller, and transmit the second signal in the second direction through the two ports of the fourth timing controller.

The plurality of timing controllers may be further configured to, based on one or more timing controllers of the plurality of timing controllers not receiving the first signal within the predetermined threshold time: identify, among the one or more timing controllers not receiving the first signal, a boundary timing controller that is closest to the first timing controller in the first direction, identify a timing controller among the plurality of timing controllers that is directly connected to the boundary timing controller in the second direction among the plurality of timing controllers, control the boundary timing controller to transmit the state signal in the first direction, and control the timing controller directly connected to the boundary timing controller in the second direction to transmit the state signal in the second direction.

The electronic device may further include at least one memory, and the plurality of timing controllers may be further configured to: based on identifying the input/output direction of each of the two ports of each timing controller of the plurality of timing controllers corresponding to the first direction, store information on the identified input/output directions in the at least one memory, and based on the display panel being activated after being deactivated, identify the input/output direction corresponding to the first direction of each of the two ports of each timing controller of the plurality of timing controllers based on the information on the identified input/output directions stored in the at least one memory.

The plurality of timing controllers may be connected to each other in a daisy chain manner through the two ports included in each timing controller of the plurality of timing controllers.

According to an aspect of the disclosure, a method of controlling an electronic device includes: receiving, from a first processor of the electronic device by a plurality of timing controllers of the electronic device, a first signal including image data and a control instruction for transmitting the image data in a first direction, wherein each timing controller of the electronic device includes two ports disposed in opposite directions, and wherein the plurality of timing controllers are connected to each other through the respective two ports; identifying, by the plurality of timing controllers, an input/output direction of each of the two ports of each of the plurality of timing controllers corresponding to the first direction; configuring the two ports of each timing controller of the plurality of timing controllers to the correspond to the identified input/output directions; and transmitting, by the plurality of timing controllers, the first signal in the first direction through the two ports of each timing controller of the plurality of timing controllers.

The method may further include: transmitting, by a second processor of the electronic device through the plurality of timing controllers, a second signal in a second direction opposite to the first direction, wherein the second signal may include the image data and a control instruction for transmitting the image data in the second direction; and based on the plurality of timing controllers receiving the first signal from the first processor, preventing transmission of the second signal in the second direction by the plurality of timing controllers while the first signal is transmitted in the first direction.

The plurality of timing controllers may include a first timing controller directly connected to the first processor, a second timing controller directly connected to the first timing controller, a third timing controller directly connected to the second timing controller, and a fourth timing controller directly connected to the second processor, the first direction may be a transmission direction of the first signal from the first timing controller to the fourth timing controller, and the second direction may be a transmission direction of the second signal from the fourth timing controller to the first timing controller.

The first timing controller may include a first port directly connected to the first processor and a second port directly connected to the second timing controller, and the identifying of the input/output directions may further include: based on the first timing controller receiving the first signal from the first processor, identifying, by the first timing controller, the first port as an input port and the second port as an output port.

The method may further include: based on the fourth timing controller receiving the first signal within a predetermined threshold time, transmitting, by the fourth timing controller in the second direction, a state signal related to a state of a display panel of the electronic device; and based on the fourth timing controller not receiving the first signal within the predetermined threshold time: receiving the second signal from the second processor; identifying the input/output directions of each of the two ports of the fourth timing controller corresponding to the second direction, configuring the input/output direction of each of the two ports of the fourth timing controller to the identified input/output directions of the two ports of the fourth timing controller; and transmitting the second signal in the second direction through the two ports of the fourth timing controller.

The method may further include: based on one or more timing controllers of the plurality of timing controllers not receiving the first signal within the predetermined threshold time: identifying among the one or more timing controllers not receiving the first signal, by the plurality of timing controllers, a boundary timing controller that is closest to the first timing controller in the first direction; identifying a timing controller among the plurality of timing controllers that is directly connected to the boundary timing controller in the second direction among the plurality of timing controllers, controlling, by the plurality of timing controllers, the boundary timing controller to transmit the state signal in the first direction; and controlling, by the plurality of timing controllers, the timing controller directly connected to the boundary timing controller in the second direction to transmit the state signal in the second direction.

The method may further include: based on identifying the input/output direction of each of the two ports of each timing controller of the plurality of timing controllers corresponding to the first direction, storing, by the plurality of timing controllers, information on the identified input/output directions in at least one memory of the electronic device; and based on a display panel of the electronic device being activated after being deactivated, identifying, by the plurality of timing controllers, the input/output direction corresponding to the first direction of each of the two ports of each timing controller of the plurality of timing controllers based on the information on the identified input/output directions stored in the at least one memory.

According to an aspect of the disclosure, a non-transitory computer readable medium including instructions stored therein, which when executed by at least one processor cause the at least one processor to execute a method of controlling an electronic device, where the method includes: receiving, from a first processor of the electronic device by a plurality of timing controllers of the electronic device, a first signal including image data and a control instruction for transmitting the image data in a first direction, wherein each timing controller of the electronic device includes two ports disposed in opposite directions, and wherein the plurality of timing controllers are connected to each other through the respective two ports; identifying, by the plurality of timing controllers, an input/output direction of each of the two ports of each of the plurality of timing controllers corresponding to the first direction; configuring the two ports of each timing controller of the plurality of timing controllers to the correspond to the identified input/output directions; and transmitting, by the plurality of timing controllers, the first signal in the first direction through the two ports of each timing controller of the plurality of timing controllers.

The method may further include: transmitting, by a second processor of the electronic device through the plurality of timing controllers, a second signal in a second direction opposite to the first direction, wherein the second signal may include the image data and a control instruction for transmitting the image data in the second direction; and based on the plurality of timing controllers receiving the first signal from the first processor, preventing transmission of the second signal in the second direction by the plurality of timing controllers while the first signal is transmitted in the first direction.

The plurality of timing controllers may include a first timing controller directly connected to the first processor, a second timing controller directly connected to the first timing controller, a third timing controller directly connected to the second timing controller, and a fourth timing controller directly connected to the second processor, the first direction may be a transmission direction of the first signal from the first timing controller to the fourth timing controller, and the second direction may be a transmission direction of the second signal from the fourth timing controller to the first timing controller.

The first timing controller may include a first port directly connected to the first processor and a second port directly connected to the second timing controller, and the identifying of the input/output directions may further include: based on the first timing controller receiving the first signal from the first processor, identifying, by the first timing controller, the first port as an input port and the second port as an output port.

The method may further include: based on the fourth timing controller receiving the first signal within a predetermined threshold time, transmitting, by the fourth timing controller in the second direction, a state signal related to a state of a display panel of the electronic device; and based on the fourth timing controller not receiving the first signal within the predetermined threshold time: receiving the second signal from the second processor; identifying the input/output directions of each of the two ports of the fourth timing controller corresponding to the second direction, configuring the input/output direction of each of the two ports of the fourth timing controller to the identified input/output directions of the two ports of the fourth timing controller; and transmitting the second signal in the second direction through the two ports of the fourth timing controller.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
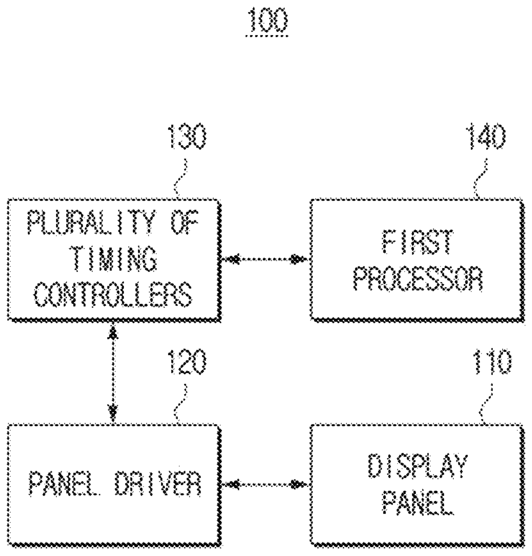
FIG. 1 is a block diagram showing a schematic configuration of an electronic device according to one or more embodiments of the disclosure.

The disclosure may be variously modified and have one or more embodiments, and specific embodiments of the disclosure are thus shown in the drawings and described in detail in the detailed description. However, it is to be understood that the scope of the disclosure is not limited to the specific embodiments, and includes various modifications, equivalents and/or alternatives according to the embodiments of the disclosure. Throughout the accompanying drawings, similar components are denoted by similar reference numerals.

In describing the disclosure, the description omits a detailed description of a case where the detailed description of the known functions or configurations related to the disclosure is determined to unnecessarily obscure the gist of the disclosure.

In addition, the following embodiments may be modified in various different forms, and the scope and spirit of the disclosure are not limited to the following embodiments. Rather, these embodiments are provided to make the disclosure thorough and complete, and to completely transfer the spirit of the disclosure to those skilled in the art.

Terms used in the disclosure are used only to describe the specific embodiments rather than limiting the scope of the disclosure. A term of a singular number may include its plural number unless explicitly indicated otherwise in the context.

In the disclosure, an expression "have," "may have," "include," "may include" or the like, indicates existence of a corresponding feature (for example, a numerical value, a function, an operation, or a component such as a part), and does not exclude existence of an additional feature.

In the disclosure, expressions "A or B," "at least one of A and/or B," "one or more of A and/or B" and the like, may include all possible combinations of items enumerated together. For example, "A or B," "at least one of A and B" or "at least one of A or B" may indicate all of 1) a case where at least one A is included, 2) a case where at least one B is included, or 3) a case where both of at least one A and at least one B are included.

Expressions "first," "second" and the like, used in the disclosure may indicate various components regardless of the sequence or importance of the components. The expression is used only to distinguish one component from another component, and does not limit the corresponding component.

In a case where a component (for example, a first component) is mentioned to be "(operatively or communicatively) coupled with/to" or "connected to" another component (for example, a second component), it is to be understood that such a component is directly coupled to the other component or coupled to the other component through still another component (for example, a third component).

On the other hand, in a case where a component (for example, the first component) is mentioned to be "directly coupled to" or "directly connected to" another component (for example, the second component), it is to be understood that still another component (for example, the third component) is not present between such a component and the other component.

An expression "configured (or set) to" used in the disclosure may be replaced by an expression "suitable for," "having the capacity to," "designed to," "adapted to," "made to" or "capable of" based on a situation. The expression "configured (or set) to" may not necessarily indicate "specifically designed to" in hardware.

Instead, an expression "a device configured to" in any situation may indicate that the device may "perform~" together with another device or component. For example, "a processor configured (or set) to perform A, B and C" may indicate a dedicated processor (for example, an embedded processor) that may perform the corresponding operations or a generic-purpose processor (for example, a central processing unit (CPU) or an application processor) that may perform the corresponding operations by executing one or more software programs stored in a memory device.

In the embodiments, a "module" or a "~er/or" may perform at least one function or operation, and be implemented by hardware or software, or be implemented by a combination of hardware and software. In addition, a plurality of "modules" or a plurality of "~ers/ors" may be integrated in at least one module and be implemented by at least one processor except for a "module" or an "~er/or" that needs to be implemented by specific hardware.

Meanwhile, the drawings schematically show various elements and regions. Therefore, the spirit of the disclosure is not limited by relative sizes or intervals shown in the accompanying drawings.

Hereinafter, the embodiments of the disclosure are described in detail with reference to the accompanying drawings for those skilled in the art to which the disclosure pertains to easily practice the disclosure.

Figure 2:
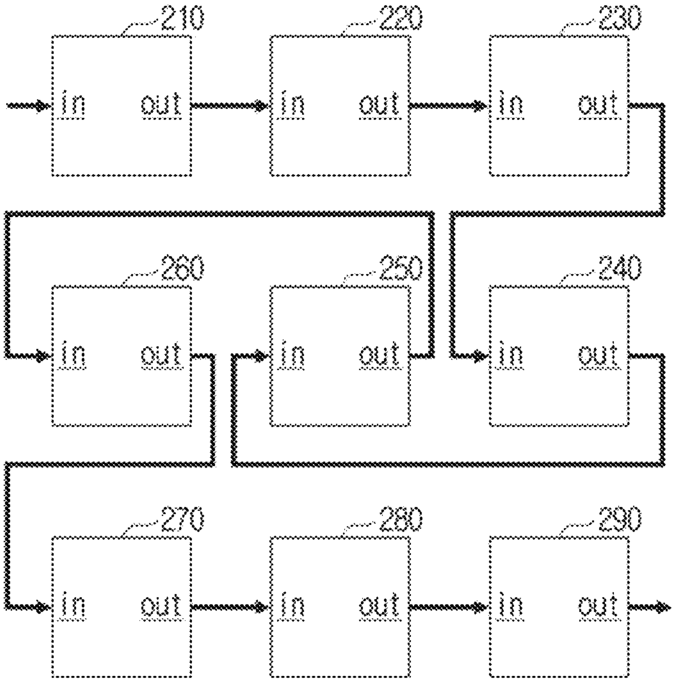
FIG. 2 is a view showing a connection structure between a plurality of timing controllers.
Figure 3:
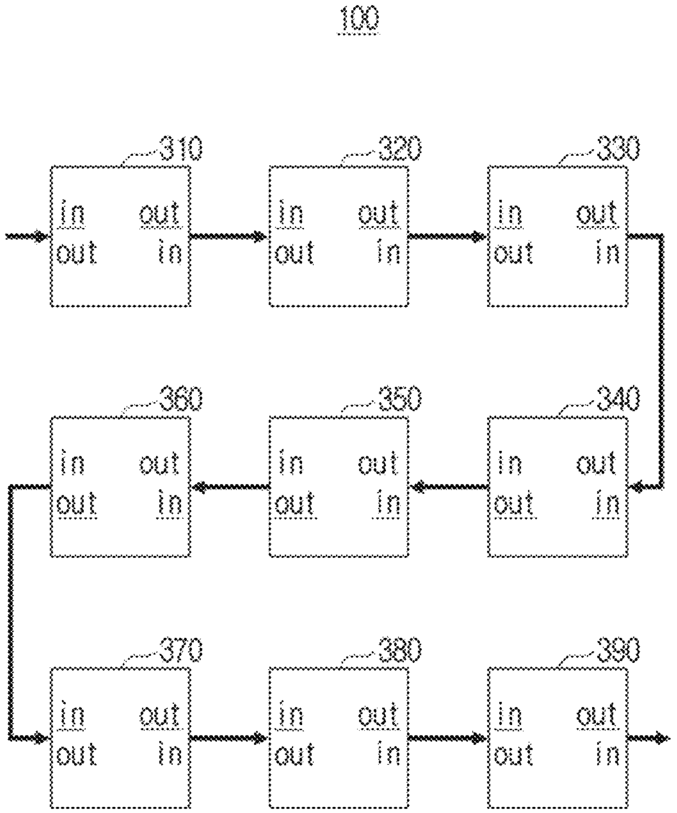
FIG. 3 is a view showing a connection structure between a plurality of timing controllers according to one or more embodiments of the disclosure.

FIG. 1 is a block diagram showing a schematic configuration of an electronic device 100 according to one or more embodiments of the disclosure. FIG. 2 is a view showing a connection structure between a plurality of timing controllers 130, and FIG. 3 is a view showing a connection structure between a plurality of timing controllers 130 according to one or more embodiments of the disclosure.

As shown in FIG. 1, the electronic device 100 according to one or more embodiments of the disclosure may include a display panel 110, a panel driver 120, a plurality of timing controllers 130, and a first processor 140.

The display panel 110 may display an image corresponding to image data. Specifically, the display panel 110 may include a plurality of light emitting elements and a plurality of pixel driving circuits for driving each of the plurality of light emitting elements, and display the image by using the plurality of light emitting elements and the plurality of pixel driving circuits.

Each of the plurality of light emitting elements may include a light emitting layer and an n-type semiconductor layer and a p-type semiconductor layer respectively stacked on top and bottom of the light emitting layer, and emit light under control of the panel driver 120. The light emitting element may be a general light emitting diode (LED) element, and in particular, may be a micro light emitting diode (LED), which is a subminiature LED having a size of 10 μm to 100 μm. In addition, light emitting element is not limited to any particular type as long as the light emitting element meets the purpose of the disclosure.

Specifically, the display panel 110 according to the disclosure may be divided into a plurality of regions. Here, a criterion for dividing the plurality of regions may depend on an embodiment. For example, as described below with reference to FIGS. 7 and 8, the display panel 110 may be divided into the plurality of regions by a plurality of cabinets. However, the criterion for dividing the plurality of regions included in the display panel 110 may depend on a size of the display panel 110 and a type of the electronic device.

The plurality of pixel driving circuits may drive the plurality of light emitting elements. Specifically, the plurality of light emitting elements may respectively be mounted on a driving circuit layer including the plurality of pixel driving circuits for the plurality of pixel driving circuits to be electrically connected to the plurality of light emitting elements, and each of the plurality of light emitting elements may be included in a sub-pixel of the display panel 110.

The panel driver 120 may control driving of the display panel 110. Specifically, the panel driver 120 may include a plurality of driver integrated circuits (ICs) and switching elements.

The plurality of driver ICs included in the panel driver 120 may control light emission of the plurality of light emitting elements respectively connected to the plurality of pixel driving circuits by driving the plurality of pixel driving circuits. Meanwhile, the driving of the display panel 110 according to the disclosure is not limited to any particular method. For example, the driving of the display panel 110 may be performed in a passive matrix method or an active matrix method.

The panel driver 120 may further include a graphic random-access memory (GRAM) and a power generating circuit. Here, the graphic RAM may serve as a memory 160 temporarily storing data to be input to the driver IC. In addition, the power generating circuit may generate a voltage for driving the display panel 110 and supply the voltage to the driver IC.

In particular, the panel driver 120 according to the disclosure may separately control each of the plurality of regions of the display panel 110. For example, a first driver IC included in the panel driver 120 may control a first region of the display panel 110, and a second driver IC included in the panel driver 120 may control a second region of the display panel 110.

The plurality of timing controllers 130 may control the panel driver 120. Specifically, the plurality of timing controllers 130 may adjust a signal received from the first processor 140 or a second processor 150 into a signal required by the panel driver 120, and transmit the adjusted signal to the panel driver 120. In addition, the plurality of timing controllers 130 may receive a state signal related to a state of the display panel 110 from the panel driver 120, and transmit the received state signal to the first processor 140 or the second processor 150.

Meanwhile, the plurality of timing controllers 130 may further include a field programmable gate array (FPGA), an application specific integrated circuit (SIC), or the like. In addition, the plurality of timing controllers 130 may perform serial communication with the panel driver 120 in general. For example, the communication between the plurality of timing controllers 130 and the panel driver 120 may be performed through transmissions of a clock signal, a signal data in (SDI) signal, and a signal data out (SDO) signal.

The plurality of timing controllers 130 may correspond to each of the plurality of regions of the display panel 110. For example, the plurality of timing controllers 130 may include a first timing controller directly connected to the first processor 140, a second timing controller directly connected to the first timing controller, and a third timing controller directly connected to the second timing controller. In addition, the first timing controller may control the first driver IC corresponding to the first region of the display panel 110, the second timing controller may control the second driver IC corresponding to the second region of the display panel 110, and the third timing controller may control the third driver IC corresponding to the third region of the display panel 110.

The plurality of timing controllers 130 according to the disclosure may each include two ports disposed in opposite directions, and may be connected to each other through the two ports. The two ports included in each of the plurality of timing controllers 130 may be connected to each other through a signal transmission line. Signal transmission through the connection between the plurality of timing controllers 130 may be performed based on an Ethernet standard, but is not limited thereto.

In particular, the plurality of timing controllers 130 may be connected to each other in a daisy chain manner through the two ports included in each of the plurality of timing controllers 130. For example, one of the two ports included in the first timing controller may be connected to one of the two ports included in the second timing controller through the signal transmission line, and the other one of the two ports included in the second timing controller may be connected to one of the two ports included in the third timing controller through the signal transmission line.

The two ports included in each of the plurality of timing controllers 130 may be operated as an input port for receiving the signal or an output port for transmitting the signal, and the description describes below an embodiment related to identifying input/output directions of the two ports included in each of the plurality of timing controllers 130.

The first processor 140 may transmit the signal in a first direction through the plurality of timing controllers 130. Specifically, the first processor 140 may transmit the first signal including the image data and a control instruction for transmitting the image data in the first direction to the timing controller directly connected to the first processor 140 among the plurality of timing controllers 130. The first processor 140 may generate the first signal by merging the image data and the control instruction, divide the first signal to correspond to each of the plurality of regions, and transmit the same to the plurality of timing controllers 130.

As used herein, the first direction refers to a transmission direction of the signal from the first processor 140 to the first timing controller directly connected to the first processor 140. Meanwhile, the control instruction included in the first signal may be included in a specific frame of the image data, or may be transmitted to the plurality of timing controllers 130 as a signal separate from the first signal.

The first processor 140 according to the disclosure may also be referred to as a microprocessor computer (MICOM), and in particular, one first processor 140 may correspond to the plurality of timing controllers 130. For example, the timing controller may be provided for each cabinet corresponding to each of the plurality of regions of the display panel 110, and one first processor 140 may correspond to the plurality of regions of the display panel 110. The first processor 140 is not particularly limited to any specific type, and may be implemented as a combination of the plurality of processors in some embodiments.

In one or more embodiments, the plurality of timing controllers 130 may identify the input/output directions of the two ports included in each of the plurality of timing controllers 130 that correspond to the first direction in case of receiving the first signal including the image data and the control instruction for transmitting the image data in the first direction from the first processor 140. In addition, the plurality of timing controllers 130 may transmit the first signal in the first direction through the two ports included in each of the plurality of timing controllers 130 and have the input/output directions identified as corresponding to the first direction.

For example, the first timing controller may include a first port directly connected to the first processor 140 and a second port directly connected to the second timing controller. In addition, the first timing controller may identify the first port as the input port and the second port as the output port in case of receiving the first signal from the first processor 140.

The second timing controller may include a third port directly connected to the first timing controller and a fourth port directly connected to the third timing controller. In addition, in case of receiving the first signal from the first timing controller, the second timing controller may identify the third port as the input port and the fourth port as the output port.

In the same way as is described for the first timing controller and the second timing controller, the plurality of timing controllers 130 may identify the input/output directions of the two ports included in each of the plurality of timing controllers 130 that correspond to the first direction, and may transmit the first signal in the first direction through the two ports having the input/output directions identified as corresponding to the first direction.

Meanwhile, the plurality of timing controllers 130 may store information on the input/output directions of the two ports in the memory 160 where the input/output directions of the two ports included in each of the plurality of timing controllers 130 that correspond to the first direction are identified. The plurality of timing controllers 130 may identify the input/output directions of the two ports included in each of the plurality of timing controllers 130 that correspond to the first direction based on the information on the input/output directions of the two ports stored in the memory 160 in a case where the display panel 110 is turned on after being turned off. In addition, the plurality of timing controllers 130 may transmit the first signal in the first direction through the two ports included in each of the plurality of timing controllers 130 and having the input/output directions identified as corresponding to the first direction.

As shown in FIG. 2, according to some conventional designs, in a plurality of timing controllers 210 to 290 corresponding to each of nine regions dividing the display panel 110, positions of an input port in and an output port out included in each of the plurality of timing controllers 210 to 290 may be fixed as shown in FIG. 2. In this case, if the third timing controller 230 and fourth timing controller 240 of FIG. 2 are connected to each other through the signal transmission line, the output port of the third timing controller 230 may not be able to be connected to the output port of the fourth timing controller 240. It is thus necessary to design the timing controllers to bypass the input port of the fourth timing controller 240. In addition, such a wiring bypass problem may also be caused in connection between other timing controllers.

On the other hand, as shown in FIG. 3, according to the disclosure, in the plurality of timing controllers 130 (represented as timing controllers 310 to 390 in FIG. 3) corresponding to each of the nine regions dividing the display panel 110, positions of the input port in and the output port out included in each of the plurality of timing controllers 310 to 390 are not fixed. Therefore, input/output directions of two ports included in each of the plurality of timing controllers 310 to 390 may be variably determined (or set) depending on which timing controller among the plurality of timing controllers 310 to 390 receives a predetermined signal (e.g., first signal including the image data and the control instruction).

In the embodiment of FIG. 3, in a case where the first signal is received from the first processor 140 by the first timing controller 310, the plurality of timing controllers 310 to 390 may identify the input/output directions of the two ports included in each of the plurality of timing controllers 310 to 390 that correspond to the first direction as indicated by an underline in FIG. 3. For example, the "in" or the "out" which are underlined in FIG. 3 indicate which port is identified as the input port or the output port.

As such, according to the disclosure, the electronic device 100 may variably determine the input/output directions of the two ports included in each of the plurality of timing controllers 310 to 390. Therefore, in a case where the third timing controller 330 and fourth timing controller 340 of FIG. 3 are connected to each other through the signal transmission line, the output port of the third timing controller 330 may be connected to the output port of the fourth timing controller 340, and similarly, the connection between other timing controllers may be simplified.

As a result, according to the embodiment described above with reference to FIGS. 1 to 3, the electronic device 100 may variably determine the input/output directions of the two ports included in each of the plurality of timing controllers 130, thus significantly simplifying the design of the signal transmission line for connecting the plurality of timing controllers 130 depending on which timing controller among the plurality of timing controllers 130 receives the predetermined signal.

Figure 4:
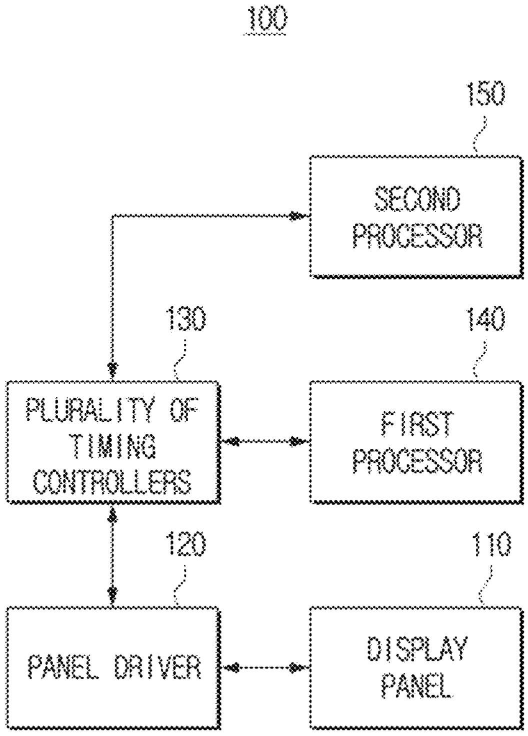
FIG. 4 is a view showing a schematic configuration of the electronic device according to one or more embodiments of the disclosure.
Figure 5:
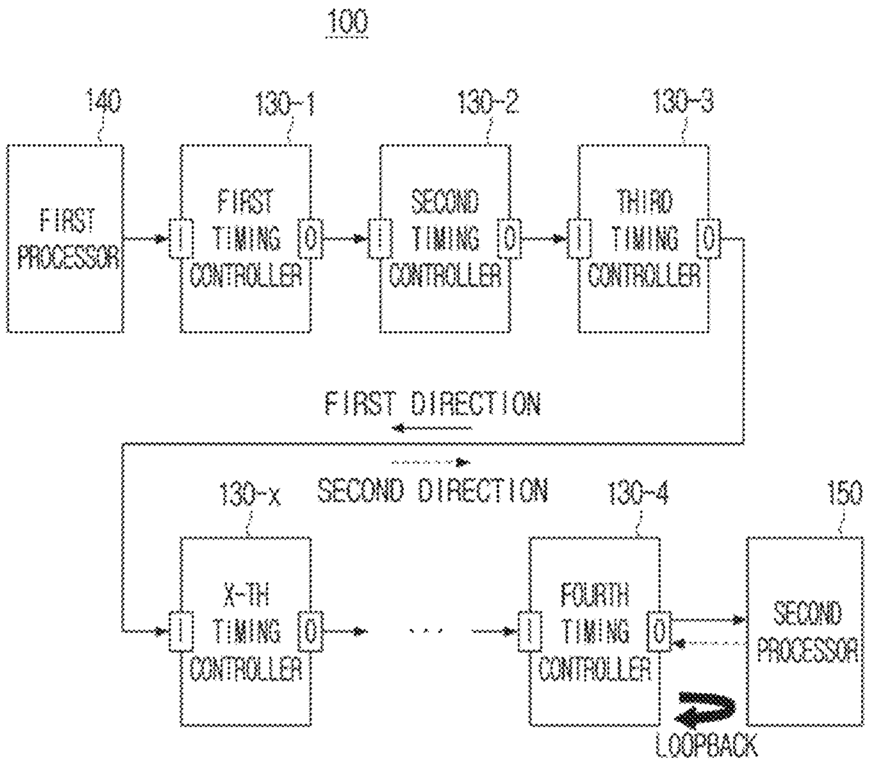
FIG. 5 is a view for explaining a process of transmitting a first signal and a state signal according to one or more embodiments of the disclosure.
Figure 6:
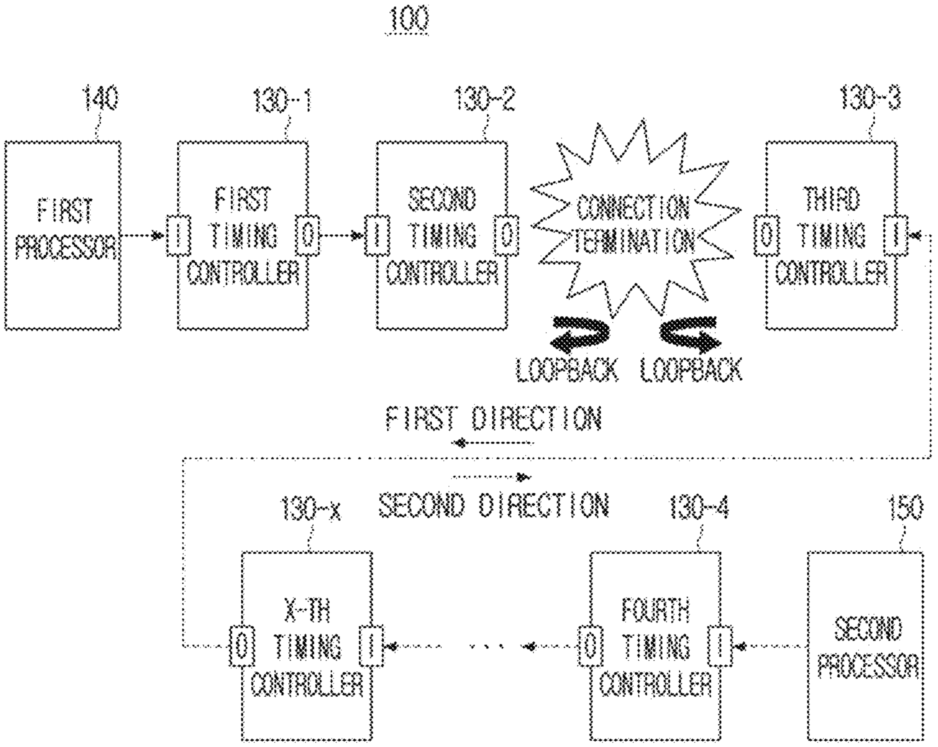
FIG. 6 is a view for explaining a process of transmitting the first signal, a second signal, and the state signal according to one or more embodiments of the disclosure.

FIG. 4 is a view showing a schematic configuration of the electronic device 100 according to one or more embodiments of the disclosure. FIG. 5 is a view for explaining a process of transmitting the first signal and the state signal according to one or more embodiments of the disclosure. In addition, FIG. 6 is a view for explaining a process of transmitting the first signal, a second signal, and the state signal according to one or more embodiments of the disclosure.

As shown in FIG. 4, the electronic device 100 according to one or more embodiments of the disclosure may further include a second processor 150 as well as the display panel 110, the panel driver 120, the plurality of timing controllers 130, and the first processor 140. That is, as described above in the description provided with reference to FIGS. 1 to 3, one or more embodiments according to the disclosure may be implemented even where the electronic device 100 includes only the first processor 140 without including the second processor 150. However, as described in detail below, the electronic device 100 may further include the second processor 150 together with the first processor 140. Hereinafter, with reference to FIGS. 4 to 6, the description thus describes an embodiment where the electronic device 100 includes the first processor 140 and the second processor 150.

The second processor 150 may transmit the signal through the plurality of timing controllers 130 in a second direction. Specifically, the second processor 150 may transmit a second signal including the image data and a control instruction for transmitting the image data in the second direction to the timing controller directly connected to the second processor 150 among the plurality of timing controllers 130. Hereinafter, the description describes in detail an embodiment where the electronic device 100 includes the second processor 150 with reference to FIGS. 5 and 6.

The second processor 150 according to the disclosure may also be referred to as the microprocessor computer (MICOM) like the first processor 140, and one second processor 150 may correspond to the plurality of timing controllers 130. For example, the timing controller may be provided for each cabinet corresponding to each of the plurality of regions of the display panel 110, and in particular, one second processor 150 may correspond to the plurality of regions of the display panel 110. The second processor 150 is not particularly limited to any specific type, and may be implemented as a combination of the plurality of processors in some embodiments.

Referring to FIG. 5 and FIG. 6, the plurality of timing controllers 130 may include a first timing controller 130-1 directly connected to the first processor 140, a second timing controller 130-2 directly connected to the first timing controller 130-1, a third timing controller 130-3 directly connected to the second timing controller 130-2, and a fourth timing controller 130-4 directly connected to the second processor 150. In addition, one or more timing controllers **130-*x* may be included between the third timing controller 130-3 and the fourth timing controller 130-4**.

In the embodiments of FIGS. 5 and 6, the first direction is a transmission direction of the signal from the first timing controller 130-1 to the fourth timing controller 130-4, and the second direction is a transmission direction of the signal from the fourth timing controller 130-4 to the first timing controller 130-1. In the embodiments of FIGS. 5 and 6, code I and code O indicate a state where the two ports included in a plurality of timing controllers 130 are respectively identified as an input port "I" and an output port "O".

As described above with reference to FIGS. 1 to 3, in case where the first signal is received from the first processor 140, the plurality of timing controllers 130 may identify the input/output directions of the two ports included in each of the plurality of timing controllers 130 that correspond to the first direction, and may transmit the first signal in the first direction through the two ports included in each of the plurality of timing controllers 130 and having the input/output directions identified as corresponding to the first direction.

The second processor 150 may transmit the second signal to the fourth timing controller 130-4. However, the fourth timing controller 130-4 may not transmit the second signal in the second direction in a case where a time point at which the fourth timing controller 130-4 receives the first signal from the first processor 140 precedes a time point at which the fourth timing controller 130-4 receives the second signal from the second processor 150. That is, the plurality of timing controllers 130 may prevent the transmission of the second signal in the second direction while the first signal is transmitted in the first direction.

More specifically, a collision between the first signal and the second signal may occur if the second signal transmitted by the second processor 150 is also transmitted through the plurality of timing controllers 130 in the second direction while the first signal transmitted by the first processor 140 is transmitted in the first direction through the plurality of timing controllers 130. Such a collision between the first signal and the second signal may be caused in a case where loopback (specific meaning is described below) of an unintended signal is performed by at least one of the plurality of timing controllers 130 due to a system error or the like.

Therefore, in a case where the input/output directions of the two ports included in each of the plurality of timing controllers 130 that correspond to the first direction for the transmission of the first signal are identified, the plurality of timing controllers 130 may maintain the input/output directions of the two ports included in each of the plurality of timing controllers 130 to correspond to the first direction without changing the directions to correspond to the second direction even in case that the second signal is transmitted by the second processor 150.

The second processor 150 may start the transmitting of the second signal after a predetermined threshold time elapses after receiving the first signal transmitted by the first processor 140 to prevent the collision between the first signal and the second signal as described above. Here, the threshold time may depend on a developer's setting or a user's setting.

The fourth timing controller 130-4 may transmit the state signal related to the state of the display panel 110 in the second direction without transmitting the second signal in the second direction in a case where the first signal is received within the threshold time. That is, in case where the first signal is transmitted from the first timing controller 130-1 to the fourth timing controller 130-4, the state signal may be transmitted from the fourth timing controller 130-4 to the first timing controller 130-1. This configuration is expressed as the loopback of a signal in FIGS. 5 and 6. For example, the state signal related to the state of the display panel 110 may include error information of the display panel 110 and monitoring information of the display panel 110. In addition, the state signal may include various information necessary for the first processor 140 or the second processor 150 to identify the state of the display panel 110.

The fact that the first signal is transmitted to the fourth timing controller 130-4 within the threshold time in the above indicates that the signal is normally transmitted from the first timing controller 130-1 to the fourth timing controller 130-4. However, the signal may not be normally transmitted between the plurality of timing controllers 130. For example, a problem may occur in the signal transmission line between the plurality of timing controllers 130, a problem may occur in the connection between the signal transmission line and the input port or output port included in the plurality of timing controllers 130, or the signal may not be normally transmitted between the plurality of timing controllers 130.

In a case where the signal is not normally transmitted between the plurality of timing controllers 130, the first signal may not be transmitted to the fourth timing controller 130-4 within the threshold time. Hereinafter, the description describes an embodiment of a case where the signal is not normally transmitted between the plurality of timing controllers 130.

In a case where the first signal is not received by at least one of the plurality of timing controllers 130 within the threshold time, the fourth timing controller 130-4 may transmit the second signal to the timing controller directly connected to the fourth timing controller 130-4 in the second direction. In addition, the plurality of timing controllers 130 may identify a first timing controller not receiving the first signal in order from the first timing controller 130-1 in the first direction (also referred to as a "boundary timing controller") and a timing controller directly connected to the first timing controller in the second direction among the plurality of timing controllers 130.

In a case of identifying the first timing controller not receiving the first signal and the timing controller directly connected to the first timing controller in the second direction, the plurality of timing controllers 130 may control the first timing controller to transmit the state signal in the first direction, and control the timing controller directly connected to the first timing controller in the second direction to transmit the state signal in the second direction.

For example, as shown in FIG. 6, in a case where the connection between the second timing controller 130-2 and the third timing controller 130-3 is terminated, the first signal may be transmitted only to the second timing controller 130-2, and may not be transmitted from the third timing controller 130-3 to the fourth timing controller 130-4. Accordingly, the fourth timing controller 130-4 may identify the input/output directions of the two ports included in the fourth timing controller 130-4 that correspond to the second direction in a case where the first signal is not received within the threshold time.

In addition, the fourth timing controller 130-4 may transmit the second signal in the second direction through the two ports included in the fourth timing controller 130-4 and having the input/output directions identified as corresponding to the second direction. In this way, the second signal may be transmitted from the fourth timing controller 130-4 to the third timing controller 130-3.

In addition, as a result of identifying the timing controllers in order from the first timing controller 130-1 in the first direction, the plurality of timing controllers 130 may identify the third timing controller 130-3 as the first timing controller not receiving the first signal among the plurality of timing controllers 130 (i.e., the boundary timing controller), and identify the second timing controller 130-2 as a timing controller directly connected to the third timing controller 130-3 in the second direction. In addition, the second timing controller 130-2 may perform loopback of a signal corresponding to the first signal by transmitting the state signal in the second direction, and the third timing controller 130-3 may perform the loopback of a signal corresponding to the second signal by transmitting the state signal in the first direction.

The disclosure describes hereinabove the case where a problem of connection termination between the two timing controllers 130 adjacent to each other among the plurality of timing controllers 130 occurs at one point (e.g., point indicated by "connection termination" in FIG. 6) with reference to FIG. 6. However, the connection termination between the two timing controllers 130 adjacent to each other among the plurality of timing controllers 130 may occur at two or more different points. In this case, loopback of a signal toward the first processor may be activated in the first timing controller positioned in the second direction based on a point closest to the first processor among two or more points where the problem occurs, and loopback of a signal toward the second processor may be activated in the first timing controller positioned in the first direction based on a point closest to the second processor among two or more points where the problem occurs.

According to the embodiments described above with reference to FIGS. 4 to 6, even if a problem occurs that the signal is not normally transmitted in the first direction by at least one timing controller among the plurality of timing controllers 130, the electronic device 100 may effectively deal with this problem by transmitting the signal to the timing controller where the problem occurs in the second direction and performing the loopback of the signal before and after the point where the problem occurs.

In particular, the electronic device 100 may be implemented as a large display device such as a signage or a video wall. Here, considerable time and cost may be consumed for its repair in case that the signal is not normally transmitted by some timing controllers, and huge economic losses may be caused depending on a transmission error of an advertisement. Therefore, such an effect described above may be more remarkable in case that the electronic device 100 is implemented as the large display device.

Figure 7:
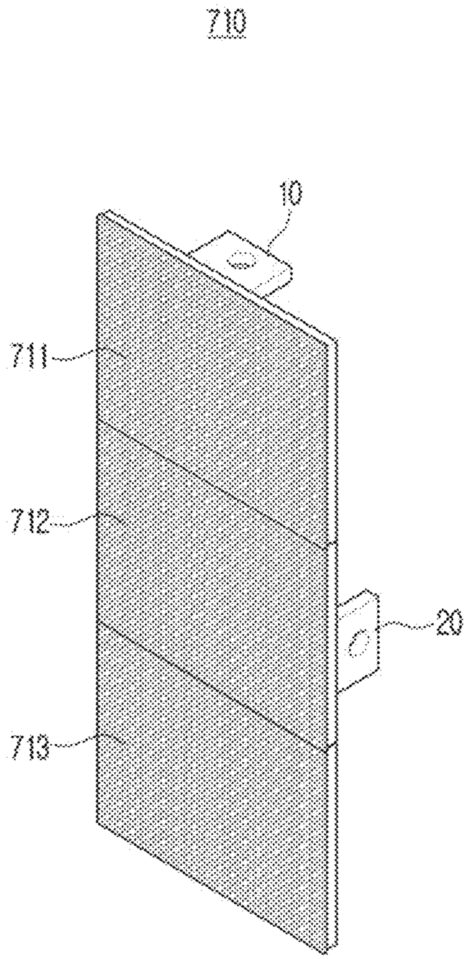
FIG. 7 is a view showing a configuration of a cabinet according to one or more embodiments of the disclosure.
Figure 8:
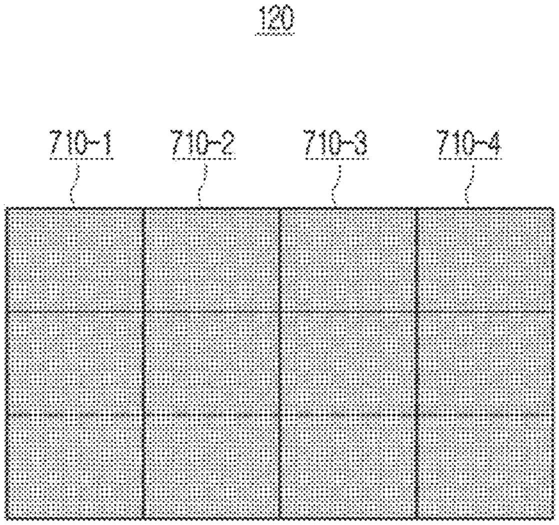
FIG. 8 is a view showing a configuration of a display panel according to one or more embodiments of the disclosure.

FIG. 7 is a view showing a configuration of the cabinet according to one or more embodiments of the disclosure; and FIG. 8 is a view showing a configuration of the display panel 110 according to one or more embodiments of the disclosure.

As described above, the electronic device 100 according to the disclosure may be implemented as a type of display device such as the signage or the video wall. In this case, the display panel 110 included in the electronic device 100 may not only be implemented as an integrated component, but also may be implemented by combining a plurality of components.

Each of FIGS. 7 and 8 is a view for explaining an embodiment in which the display panel 110 according to the disclosure is implemented by combining a plurality of cabinets 710. FIG. 7 shows one cabinet 710, and FIG. 8 shows the display panel 110 in which four cabinets 710 shown in FIG. 7 are combined with each other.

The cabinet 710 may include a base plate on which each of a plurality of display modules 711, 712, and 713 may be mounted. In addition, each of the display modules 711, 712, and 713 may be mounted on a front surface of the base plate. Accordingly, the cabinet 710 may be implemented in a bezel-less form, and the display panel 110 in which the plurality of cabinets 710 are combined with each other may display a seamless image with no break between the cabinets 710.

The cabinet 710 according to one or more embodiments of the disclosure may include a plurality of coupling parts 10 and 20 that may be combined with another cabinet 710. Accordingly, the cabinet 710 may implement one display panel 110 by being combined with another cabinet 710. For example, referring to FIG. 8, one display panel 110 may be implemented by combining a cabinet 710-1 with a plurality of other cabinets 710-2, 710-3, and 710-4 in a 4×1 manner. An arrangement type and number of the display modules 711, 712, and 713 included in the cabinet 710, and an arrangement type and number of the cabinets 710-1, 710-2, 710-3, and 710-4 included in the display panel 110 may depend on an embodiment.

Each of the plurality of timing controllers 130 according to the disclosure may be provided for each of the plurality of cabinets 710-1, 710-2, 710-3, and 710-4, and one timing controller provided for each of the plurality of cabinets 710-1, 710-2, 710-3, and 710-4 may be implemented to control the panel driver 120 included in the plurality of display modules 711, 712, and 713 included in the plurality of cabinets 710-1, 710-2, 710-3, and 710-4. However, the number of the plurality of timing controllers 130 may also be variously changed based on design.

The description provided with reference to FIGS. 7 and 8 describes that one entire display panel 110 as shown in FIG. 8 is implemented by combining the plurality of cabinets 710-1, 710-2, 710-3, and 710-4 with each other. However, in some embodiments, the display panel 110 may be implemented by combining a plurality of components (which may also be referred to as pillars) as shown in FIG. 8. In a case where one entire display panel 110 as shown in FIG. 8 is implemented by combining the plurality of cabinets 710-1, 710-2, 710-3, and 710-4 with each other, the first processor 140 and the second processor 150 according to the disclosure may control the plurality of timing controllers 130 included in the entire display panel 110. However, in a case where the display panel 110 is implemented by combining the plurality of pillars as shown in FIG. 8, the first processor 140 and the second processor 150 may be provided for each pillar.

As described above, according to the various embodiments of the disclosure, the electronic device may significantly simplify design of the signal transmission line for connecting the plurality of timing controllers 130, and effectively cope with the problem occurring in case that the signal is not normally transmitted between the plurality of timing controllers 130. Such effects may be more remarkable in case that the electronic device 100 is implemented as a large display device such as the modular display device of FIG. 8.

Figure 9:
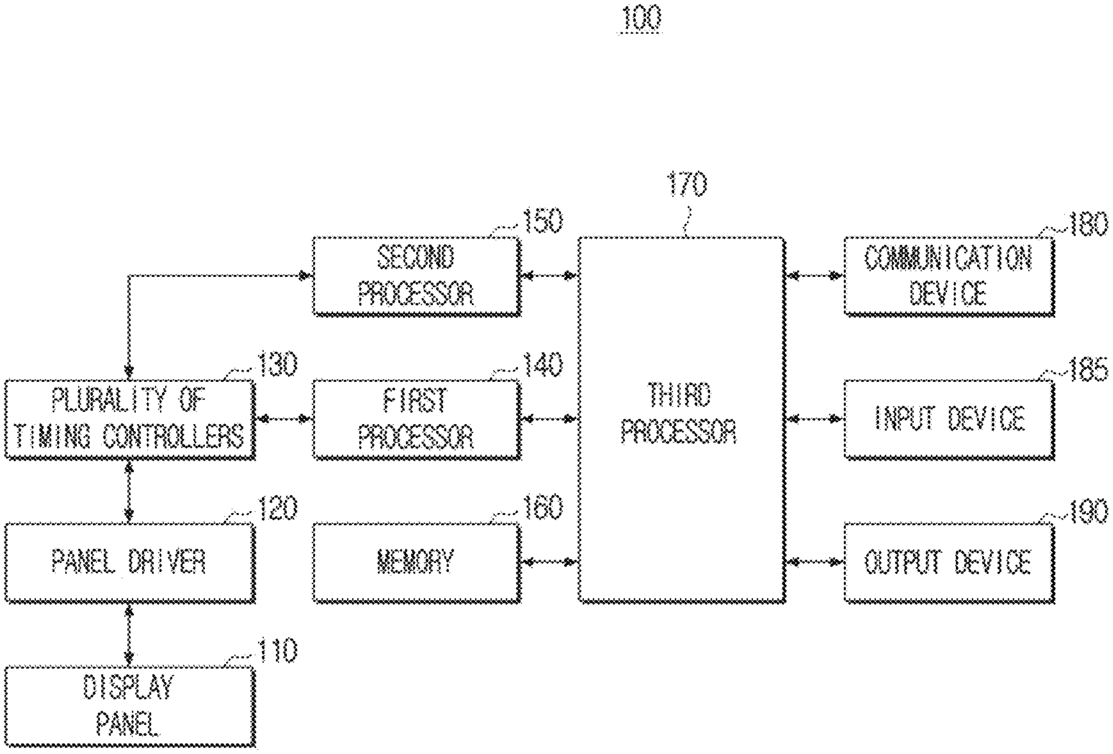
FIG. 9 is a block diagram showing a detailed configuration of the electronic device according to one or more embodiments of the disclosure.

FIG. 9 is a block diagram showing a detailed configuration of the electronic device 100 according to one or more embodiments of the disclosure.

As shown in FIG. 9, the electronic device 100 may further include the memory 160, a third processor 170, a communication device 180, an input device 185, and an output device 190 as well as the display panel 110, the panel driver 120, the plurality of timing controllers 130, the first processor 140, and the second processor 150. However, the configurations shown in FIGS. 1, 4, and 9 are only examples. A new component may be added to the configurations shown in FIGS. 1, 4, and 9 or some components may be omitted to practice the disclosure.

The memory 160 may store at least one instruction related to the electronic device 100. In addition, the memory 160 may store an operating system O/S driving the electronic device 100. In addition, the memory 160 may store various software programs or applications for operating the electronic device 100 according to the various embodiments of the disclosure. In addition, the memory 160 may include a semiconductor memory such as a flash memory, or a magnetic storing medium such as a hard disk.

Specifically, the memory 160 may store various software modules operating the electronic device 100 according to the various embodiments of the disclosure, and the processor may execute the various software modules stored in the memory 160 to thus control an operation of the electronic device 100. That is, the memory 160 may be accessed by the processor, and the readout, recording, correction, deletion, update and the like of data may be performed by the processor.

Meanwhile, in the disclosure, the term "memory 160" may include the memory 160, a read only memory (ROM) or a random access memory (RAM) in the processor, or a memory card mounted on the electronic device 100 (e.g., a micro secure digital (SD) card or a memory stick).

In particular, in the various embodiments according to the disclosure, the memory 160 may store the image data, the first signal, the second signal, the information on the input/output directions of the two ports included in each of the plurality of timing controllers 130, and the like. In addition, the memory 160 may store various information necessary to achieve the purpose of the disclosure, and the information stored in the memory 160 may be updated as the information is received from an external device or input by the user.

FIG. 9 shows that the memory 160 is implemented as one memory 160 and connected to the third processor 170, but the disclosure is not limited thereto. Specifically, the memory 160 may be implemented as a plurality of memories 160 based on the type and role of the data stored in the memory 160, and the plurality of memories 160 may be connected to at least one of the first processor 140, the second processor 150, the third processor 170, and the plurality of timing controllers 130 based on their respective roles. For example, among the plurality of memories 160, the memory 160 storing the information on the first signal and the second signal may be connected to the plurality of timing controllers 130. In this case, the plurality of timing controllers 130 may store the image data received from the first processor 140 in the memory 160, and output the image data stored in the memory 160 based on specifications of the panel driver 120.

The third processor 170 may control an overall operation of the electronic device 100. Specifically, the third processor 170 may be connected to the configuration of the electronic device 100 including the first processor 140, the second processor 150, and the memory 160, and may control the overall operation of the electronic device 100 by executing at least one instruction stored in the memory 160 as described above.

The third processor 170 may be implemented in various ways. For example, the third processor 170 may be implemented as at least one of an application specific integrated circuit (ASIC), an embedded processor, a microprocessor, a hardware control logic, a hardware finite state machine (FSM), or a digital signal processor (DSP). Meanwhile, in the disclosure, the term "third processor 170" may be used to include a central processing unit (CPU), a graphic processing unit (GPU), a microprocessor unit (MPU), or the like. Each of the first processor 140 and the second processor 150 may also be implemented in the same type as the above example.

In particular, in the various embodiments according to the disclosure, the third processor 170 may control at least one of the first processor 140 or the second processor 150 to display the image through the display panel 110. In addition, the third processor 170 may perform at least some of the operations of the first processor 140 and the second processor 150 as described above.

The description above is provided based on an assumption that the first processor 140, the second processor 150, and the third processor 170 according to the disclosure are implemented as separate components. However, at least one of the first processor 140, the second processor 150, or the third processor 170 may be integrally implemented to be included in another one, and in addition to the first processor 140, the second processor 150, and the third processor 170, an additional processor may be included in the electronic device 100.

The communication device 180 may include a circuit and may communicate with the external device. Specifically, the third processor 170 may receive various data or information from the external device connected thereto through the communication device 180, and transmit the various data or information to the external device.

The communication device 180 may include at least one of a wireless fidelity (WiFi) module, a Bluetooth module, a wireless communication module, a near field communication (NFC) module, or an ultra wide band (UWB) module. Specifically, the WiFi module and the Bluetooth module may respectively perform the communication by using a WiFi method and a Bluetooth method. In case of using the WiFi module or the Bluetooth module, the communication device 180 may first transmit and receive various connection information such as a service set identifier (SSID), connect the communication by using this connection information, and then transmit and receive various information.

In addition, the wireless communication module may perform the communication based on various communication protocols such as institute of electrical and electronics engineers (IEEE), zigbee, $3^{rd}$ generation (3G), $3^{rd}$ generation partnership project (3GPP), long term evolution (LTE), and $5^{th}$ Generation (5G). In addition, the NFC module may perform the communication by using an NFC method that uses a 13.56 MHz band among various radio frequency identification (RF-ID) frequency bands such as 135 kHz, 13.56 MHZ, 433 MHZ, 860 to 960 MHz, and 2.45 GHz. In addition, the UWB module may accurately measure time of arrival (ToA), which is time at which a pulse reaches a target, and an angle of arrival (AoA), which is the angle of arrival of a pulse at a transmission device, through the communication between UWB antennas, and may thus perform accurate distance and position recognition within an error range of several tens of centimeters (cm) indoors.

In particular, in one or more embodiments according to the disclosure, the third processor 170 may receive the image data from the external device through the communication device 180, and may receive a user command for displaying the image from a user terminal through the communication device 180.

The input device 185 may include a circuit, and the processor may receive a user command for controlling the operation of the electronic device 100 through the input device 185. Specifically, the input device 185 may include a component such as a microphone, a camera or a remote control signal receiver. In addition, the input device 185 may be implemented as a touch screen included in a display. In particular, the microphone may receive a voice signal and convert the received voice signal into an electrical signal.

In particular, in the various embodiments according to the disclosure, the third processor 170 may receive a user input for displaying the image through the input device 185, and receive a user input for controlling an operation related to the image being displayed on the display panel 110.

The output device 190 may include a circuit, and the third processor 170 may output various functions that the electronic device 100 may perform through the output device 190. In addition, the output device 190 may include at least one of the display, a speaker, or an indicator.

The display may output the image data under control of the processor. Specifically, the display may output the image pre-stored in the memory 160 under the control of the processor. The display may be implemented as a liquid crystal display panel (LCD), an organic light emitting diode (OLED) or the like, and the display may be implemented as a flexible display, a transparent display, or the like in some cases. However, the display in the disclosure is not limited to a particular type.

The speaker may output audio data under the control of the processor, and the indicator may be turned on under the control of the processor.

In particular, in one or more embodiments according to the disclosure, the third processor 170 may control at least one of the first processor 140 or the second processor 150 for a user interface related to the display of the image to be provided through the display panel 110.

Figure 10:
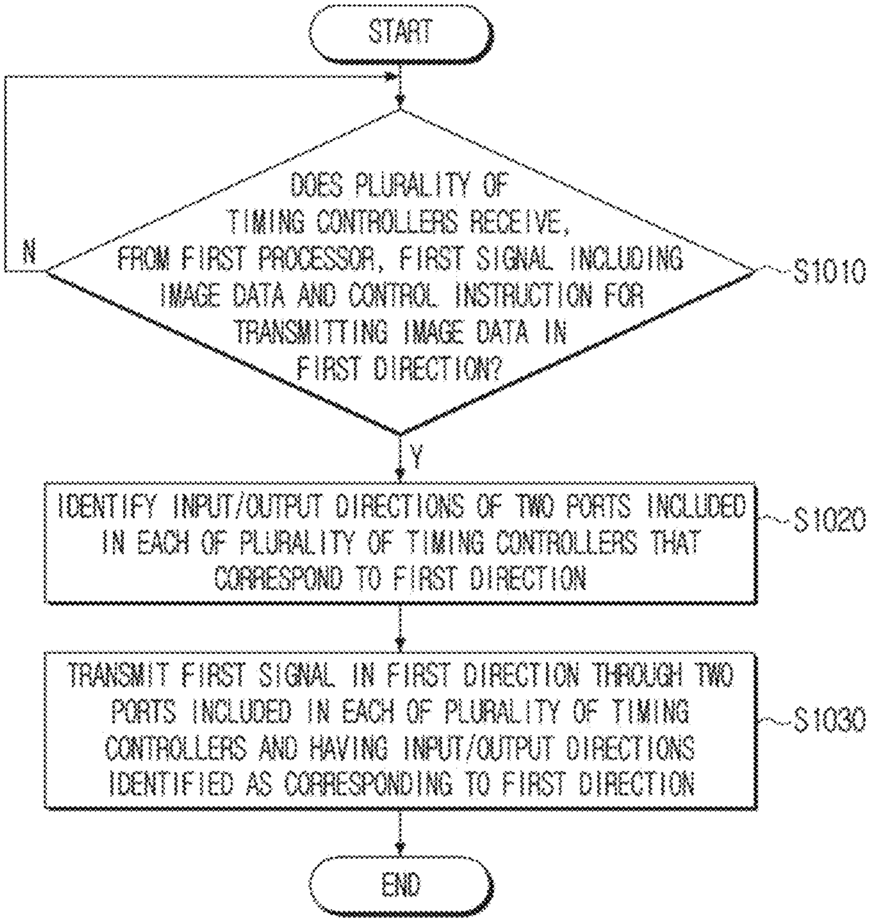
FIG. 10 is a flowchart showing a controlling method of an electronic device according to one or more embodiments of the disclosure.

FIG. 10 is a flowchart showing a method of controlling an electronic device 100 according to one or more embodiments of the disclosure.

As shown in FIG. 10, the plurality of timing controllers 130 included in the electronic device may receive, from the first processor 140, the first signal including the image data and the control instruction for transmitting the image data in the first direction (S1010). The first processor 140 may transmit the first signal including the image data and the control instruction for transmitting the image data in the first direction to the timing controller directly connected to the first processor 140 among the plurality of timing controllers 130.

The plurality of timing controllers 130 may identify the input/output directions of the two ports included in each of the plurality of timing controllers 130 that correspond to the first direction in case of receiving the first signal (S1020). The plurality of timing controllers 130 may then transmit the first signal in the first direction through the two ports included in each of the plurality of timing controllers 130 and having the input/output directions identified as corresponding to the first direction (S1030).

For example, the first timing controller may include the first port directly connected to the first processor 140 and the second port directly connected to the second timing controller. In addition, in case of receiving the first signal from the first processor 140, the first timing controller may identify the first port as the input port and the second port as the output port. The second timing controller may include the third port directly connected to the first timing controller and the fourth port directly connected to the third timing controller. In addition, in case of receiving the first signal from the first timing controller, the second timing controller may identify the third port as the input port and the fourth port as the output port. In the same way as the first timing controller and the second timing controller, the plurality of timing controllers 130 may identify the input/output directions of the two ports included in each of the plurality of timing controllers 130 that correspond to the first direction, and may transmit the first signal in the first direction through the two ports having the input/output directions identified as corresponding to the first direction.

The plurality of timing controllers 130 may store the information on the input/output directions of the two ports in the memory 160 in a case where the input/output directions of the two ports included in each of the plurality of timing controllers 130 that correspond to the first direction are identified. The plurality of timing controllers 130 may identify the input/output directions of the two ports included in each of the plurality of timing controllers 130 that correspond to the first direction based on the information on the input/output directions of the two ports stored in the memory 160 in case that the display panel 110 is turned on after being turned off. In addition, the plurality of timing controllers 130 may transmit the first signal in the first direction through the two ports included in each of the plurality of timing controllers 130 and having the input/output directions identified as corresponding to the first direction.

The control method of an electronic device 100 according to one or more embodiments as described above may be implemented as a program and provided to the electronic device 100. In particular, the program including the control method of an electronic device 100 may be stored and provided in a non-transitory computer readable medium.

Specifically, in a non-transitory computer readable recording medium which includes a program for executing a controlling method of an electronic device 100, the electronic device 100 includes the display panel 110 divided into the plurality of regions, the panel driver 120 controlling driving of the display panel 110, the plurality of timing controllers 130 controlling the panel driver 120, each including the two ports disposed in the opposite directions, connected to each other through the two ports, and each corresponding to each of the plurality of regions, and the first processor 140 transmitting the signal in the first direction through the plurality of timing controllers 130; and the controlling method of an electronic device 100 includes identifying, by the plurality of timing controllers 130, the input/output directions of the two ports included in each of the plurality of timing controllers 130 that correspond to the first direction in case that the first signal including the image data and the control instruction for transmitting the image data in the first direction is received from the first processor 140, and transmitting, by the plurality of timing controllers 130, the first signal in the first direction through the two ports included in each of the plurality of timing controllers 130 and having the input/output directions identified as corresponding to the first direction.

The description above briefly describes the control method of an electronic device 100 and the computer readable recording medium including the program for executing the controlling method of an electronic device 100. However, this description is provided only to omit a redundant description, and the various embodiments of the electronic device 100 may also be applied to the control method of an electronic device 100 and the computer readable recording medium including the program for executing the controlling method of an electronic device 100.

According to one or more embodiments of the disclosure as described above, the electronic device 100 may variably determine the direction of the input/output port included in each of the plurality of timing controllers 130, thereby simplifying the design of the signal transmission line and effectively coping with the situation where the signal is not normally transmitted.

The machine-readable storage medium may be provided in the form of a non-transitory storage medium. Here, the "non-transitory storage medium" may refer to a tangible device and only indicate that this storage medium does not include a signal (e.g., electromagnetic wave), and this term does not distinguish a case where data is semi-permanently stored in the storage medium and a case where data is temporarily stored in the storage medium from each other. For example, the "non-transitory storage medium" may include a buffer in which data is temporarily stored.

According to one or more embodiments, the method according to the various embodiments disclosed in the disclosure may be included in a computer program product and then provided. The computer program product may be traded as a product between a seller and a purchaser. The computer program product may be distributed in a form of the machine-readable storage medium (e.g., compact disc read only memory (CD-ROM)), or may be distributed online (e.g., downloaded or uploaded) through an application store (e.g., PlayStore™) or directly between two user devices (e.g., smartphones). In case of the online distribution, at least a part of the computer program product (e.g., downloadable app) may be at least temporarily stored or temporarily provided in the machine-readable storage medium such as the memory 160 included in a server of a manufacturer, a server of an application store, or a relay server.

Each component (e.g., module or program) according to the various embodiments described above may include a single entity or a plurality of entities, and some of the corresponding sub-components described above may be omitted or other sub-components may be further included in the various embodiments. Alternatively or additionally, some of the components (e.g., modules or programs) may be integrated into one entity, and may perform functions performed by the respective corresponding components before being integrated in the same or similar manner.

Operations performed by the modules, the programs, or other components according to the various embodiments may be executed in a sequential manner, a parallel manner, an iterative manner, or a heuristic manner, at least some of the operations may be performed in a different order or be omitted, or other operations may be added.

Meanwhile, a term "~er/~or" or "module" used in the disclosure may include a unit including hardware, software or firmware, and may be used interchangeably with the term, for example, a logic, a logic block, a component or a circuit. The "~er/~or" or "module" may be an integrally formed component, or a minimum unit or part performing one or more functions. For example, the module may include the application-specific integrated circuit (ASIC).

The various embodiments of the disclosure may be implemented by software including an instruction stored in the machine-readable storage medium (e.g., computer readable storage medium). The machine may be a device that invokes the stored instruction from the storage medium, may be operated based on the invoked instruction, and may include the electronic device (e.g., electronic device 100) according to the disclosed embodiments.

In case that the instruction is executed by the processor, the processor may directly perform a function corresponding to the instruction or other components may perform the function corresponding to the instruction under the control of the processor. The instruction may include codes provided or executed by a compiler or an interpreter.

Although the embodiments are shown and described in the disclosure as above, the disclosure is not limited to the specific embodiments described above, and may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic device comprising:
a display panel comprising a plurality of regions;
a panel driver comprising a plurality of driver circuits, wherein the panel driver is configured to control driving of the display panel;
a plurality of timing controllers, wherein each timing controller of the plurality of timing controllers comprises two ports disposed in opposite directions, the plurality of timing controllers are connected to each other through the respective two ports, and each timing controller of the plurality of timing controllers corresponds to a region of the plurality of regions;
memory storing instructions; and
at least one processor configured to execute one or more of the instructions,
wherein the one or more of the instructions, when executed by the at least one processor, cause the at least one processor to transmit a first signal in a first direction through the plurality of timing controllers,
wherein the first signal comprises image data and a control instruction for transmitting the image data in the first direction,
wherein the plurality of timing controllers are configured to execute one or more of the instructions, and
wherein the one or more of the instructions, when executed by the plurality of timing controllers, cause the plurality of timing controllers to:
based on receiving the first signal, identify an input/output direction of each of the two ports of each timing controller of the plurality of timing controllers corresponding to the first direction;
configure the input/output direction of each of the two ports of each timing controller of the plurality of timing controllers to correspond to the identified input/output directions;
transmit the first signal in the first direction through the two ports of each timing controller of the plurality of timing controllers; and
transmit a state signal corresponding to a state of the display panel based on whether at least one of the plurality of timing controllers receives the first signal within a predetermined threshold time, wherein the state signal is transmitted from at least one of the plurality of timing controllers to the at least one processor.

2. The electronic device of claim 1,
wherein the at least one processor comprises a first processor and a second processor,
wherein the one or more of the instructions, when executed by the first processor, cause the first processor to transmit the first signal,
wherein the one or more of the instructions, when executed by the second processor, cause the second processor to transmit a second signal in a second direction opposite to the first direction through the plurality of timing controllers,
wherein the second signal comprises the image data and a control instruction for transmitting the image data in the second direction, and
wherein the one or more of the instructions, when executed by the plurality of timing controllers, further cause the plurality of timing controllers to, based on receiving the first signal from the first processor, not transmit the second signal in the second direction while the first signal is transmitted in the first direction.

3. The electronic device of claim 2,
wherein the plurality of timing controllers comprise a first timing controller directly connected to the first processor, a second timing controller directly connected to the first timing controller, a third timing controller directly connected to the second timing controller, and a fourth timing controller directly connected to the second processor,
wherein the first direction is a transmission direction of the first signal from the first timing controller to the fourth timing controller, and
wherein the second direction is a transmission direction of the second signal from the fourth timing controller to the first timing controller.

4. The electronic device of claim 3,
wherein the two ports of the first timing controller comprise a first port directly connected to the first processor and a second port directly connected to the second timing controller, and
wherein the one or more of the instructions, when executed by the first timing controller, cause the first timing controller to, based on receiving the first signal, identify the first port as an input port and the second port as an output port.

5. The electronic device of claim 4, wherein the one or more of the instructions, when executed by the fourth timing controller, cause the fourth timing controller to:

based on receiving the first signal within the predetermined threshold time, transmit in the second direction the state signal related to the state of the display panel; and based on not receiving the first signal within the predetermined threshold time, receive the second signal, identify the input/output direction of each of the two ports of the fourth timing controller corresponding to the second direction, configure the input/output direction of each of the two ports of the fourth timing controller to correspond to the identified input/output directions of the two ports of the fourth timing controller, and transmit the second signal in the second direction through the two ports of the fourth timing controller.

6. The electronic device of claim 5, wherein the one or more of the instructions, when executed by the plurality of timing controllers, further cause the plurality of timing controllers to, based on one or more timing controllers of the plurality of timing controllers not receiving the first signal within the predetermined threshold time:

identify, among the one or more timing controllers not receiving the first signal within the predetermined threshold time, a boundary timing controller that is closest to the first timing controller in the first direction;

identify a timing controller among the plurality of timing controllers that is directly connected to the boundary timing controller in the second direction;

control the boundary timing controller to transmit the state signal in the first direction; and control the timing controller directly connected to the boundary timing controller in the second direction to transmit the state signal in the second direction.

7. The electronic device of claim 1, wherein the one or more of the instructions, when executed by the plurality of timing controllers, further cause the plurality of timing controllers to:

based on identifying the input/output direction of each of the two ports of each timing controller of the plurality of timing controllers corresponding to the first direction, store information on the identified input/output directions in the memory; and based on the display panel being activated after being deactivated, identify the input/output direction corresponding to the first direction of each of the two ports of each timing controller of the plurality of timing controllers based on the information on the identified input/output directions stored in the memory.

8. The electronic device of claim 1, wherein the plurality of timing controllers are connected to each other in a daisy chain manner through the two ports included in each timing controller of the plurality of timing controllers.

9. A method of controlling an electronic device, the method comprising:

transmitting, by at least one processor of the electronic device through a plurality of timing controllers of the electronic device, a first signal comprising image data and a control instruction for transmitting the image data in a first direction, wherein each of the plurality of timing controllers comprises two ports disposed in opposite directions, and wherein the plurality of timing controllers are connected to each other through the respective two ports;

identifying, by the plurality of timing controllers, an input/output direction of each of the two ports of each of the plurality of timing controllers corresponding to the first direction;

configuring the two ports of each timing controller of the plurality of timing controllers to correspond to the identified input/output directions;

transmitting, by the plurality of timing controllers, the first signal in the first direction through the two ports of each timing controller of the plurality of timing controllers; and transmitting a state signal corresponding to a state of a display panel of the electronic device based on whether at least one of the plurality of timing controllers receives the first signal within a predetermined threshold time, wherein the state signal is transmitted from at least one of the plurality of timing controllers to the at least one processor.

10. The method of claim 9, wherein the at least one processor comprises a first processor and a second processor, wherein the transmitting the first signal further comprises transmitting the first signal in the first direction by the first processor, and wherein the method further comprises:

transmitting, by the second processor through the plurality of timing controllers, a second signal in a second direction opposite to the first direction, wherein the second signal comprises the image data and a control instruction for transmitting the image data in the second direction; and based on the plurality of timing controllers receiving the first signal from the first processor, preventing transmission of the second signal in the second direction by the plurality of timing controllers while the first signal is transmitted in the first direction.

11. The method of claim 10, wherein the plurality of timing controllers includes a first timing controller directly connected to the first processor, a second timing controller directly connected to the first timing controller, a third timing controller directly connected to the second timing controller, and a fourth timing controller directly connected to the second processor, wherein the first direction is a transmission direction of the first signal from the first timing controller to the fourth timing controller, and wherein the second direction is a transmission direction of the second signal from the fourth timing controller to the first timing controller.

12. The method of claim 11, wherein the first timing controller includes a first port directly connected to the first processor and a second port directly connected to the second timing controller, and wherein the identifying the input/output directions further comprises:

based on the first timing controller receiving the first signal from the first processor, identifying, by the first timing controller, the first port as an input port and the second port as an output port.

13. The method of claim 12, further comprising:

based on the fourth timing controller receiving the first signal within the predetermined threshold time, transmitting, by the fourth timing controller in the second direction, the state signal related to the state of the display panel of the electronic device; and based on the fourth timing controller not receiving the first signal within the predetermined threshold time:

receiving the second signal from the second processor;

identifying the input/output directions of each of the two ports of the fourth timing controller corresponding to the second direction;

configuring the input/output direction of each of the two ports of the fourth timing controller to the identified input/output directions of the two ports of the fourth timing controller; and transmitting the second signal in the second direction through the two ports of the fourth timing controller.

14. The method of claim 13, further comprising:

based on one or more timing controllers of the plurality of timing controllers not receiving the first signal within the predetermined threshold time:

identifying among the one or more timing controllers not receiving the first signal within the predetermined threshold time, by the plurality of timing controllers, a boundary timing controller that is closest to the first timing controller in the first direction;

identifying a timing controller among the plurality of timing controllers that is directly connected to the boundary timing controller in the second direction;

controlling, by the plurality of timing controllers, the boundary timing controller to transmit the state signal in the first direction; and controlling, by the plurality of timing controllers, the timing controller directly connected to the boundary timing controller in the second direction to transmit the state signal in the second direction.

15. The method of claim 9, further comprising:

based on identifying the input/output direction of each of the two ports of each timing controller of the plurality of timing controllers corresponding to the first direction, storing, by the plurality of timing controllers, information on the identified input/output directions in at least one memory of the electronic device; and based on the display panel of the electronic device being activated after being deactivated, identifying, by the plurality of timing controllers, the input/output direction corresponding to the first direction of each of the two ports of each timing controller of the plurality of timing controllers based on the information on the identified input/output directions stored in the at least one memory.

16. A non-transitory computer readable medium having instructions stored therein, which when executed by at least one processor cause the at least one processor to execute a method of controlling an electronic device, the method comprising:

transmitting, by the at least one processor through a plurality of timing controllers of the electronic device, a first signal comprising image data and a control instruction for transmitting the image data in a first direction, wherein each of the plurality of timing controllers comprises two ports disposed in opposite directions, and wherein the plurality of timing controllers are connected to each other through the respective two ports;

identifying, by the plurality of timing controllers, an input/output direction of each of the two ports of each of the plurality of timing controllers corresponding to the first direction;

configuring the two ports of each timing controller of the plurality of timing controllers to correspond to the identified input/output directions;

transmitting, by the plurality of timing controllers, the first signal in the first direction through the two ports of each timing controller of the plurality of timing controllers; and transmitting a state signal corresponding to a state of a display panel of the electronic device based on whether at least one of the plurality of timing controllers receives the first signal within a predetermined threshold time, wherein the state signal is transmitted from at least one of the plurality of timing controllers to the at least one processor.

17. The non-transitory computer readable medium of claim 16, wherein the at least one processor comprises a first processor and a second processor, wherein the transmitting the first signal further comprises transmitting the first signal in the first direction by the first processor, and wherein the method further comprises:

transmitting, by the second processor through the plurality of timing controllers, a second signal in a second direction opposite to the first direction, wherein the second signal comprises the image data and a control instruction for transmitting the image data in the second direction; and based on the plurality of timing controllers receiving the first signal from the first processor, preventing transmission of the second signal in the second direction by the plurality of timing controllers while the first signal is transmitted in the first direction.

18. The non-transitory computer readable medium of claim 17, wherein the plurality of timing controllers includes a first timing controller directly connected to the first processor, a second timing controller directly connected to the first timing controller, a third timing controller directly connected to the second timing controller, and a fourth timing controller directly connected to the second processor, wherein the first direction is a transmission direction of the first signal from the first timing controller to the fourth timing controller, and wherein the second direction is a transmission direction of the second signal from the fourth timing controller to the first timing controller.

19. The non-transitory computer readable medium of claim 18, wherein the first timing controller includes a first port directly connected to the first processor and a second port directly connected to the second timing controller, and wherein the identifying the input/output directions further comprises:

based on the first timing controller receiving the first signal from the first processor, identifying, by the first timing controller, the first port as an input port and the second port as an output port.

20. The non-transitory computer readable medium of claim 19, wherein the method further comprises:

based on the fourth timing controller receiving the first signal within the predetermined threshold time, transmitting, by the fourth timing controller in the second direction, the state signal related to the state of the display panel of the electronic device; and based on the fourth timing controller not receiving the first signal within the predetermined threshold time:

receiving the second signal from the second processor;

identifying the input/output directions of each of the two ports of the fourth timing controller corresponding to the second direction;

configuring the input/output direction of each of the two ports of the fourth timing controller to the identified input/output directions of the two ports of the fourth timing controller; and transmitting the second signal in the second direction through the two ports of the fourth timing controller.

* * * * *